UNITED STATES PATENT OFFICE.

JULIO BALZARI, OF BUENOS AIRES, ARGENTINA.

PROCESS FOR THE PREPARATION OF THE FLESH OF ANIMALS OF THE BOVINE GENUS.

1,240,165.

Specification of Letters Patent. Patented Sept. 18, 1917.

No Drawing.

Application filed November 1, 1915. Serial No. 59,049.

*To all whom it may concern:*

Be it known that I, JULIO BALZARI, a citizen of Argentina, manufacturer, residing at Calle Maipú No. 671, Buenos Aires, Argentina, have invented a new and useful Process for the Preparation of the Flesh of Animals of the Bovine Genus, of which the following is a specification.

This invention refers to a new process for the preparation of the flesh of animals of the bovine genus, to be used as food, when such meat is to be preserved afterward by any means permitting—(1) the destruction by heat of the ferments contained in the meat and in its receptacles; (2) to avoid the penetration of ferments from the surrounding atmosphere into the said receptacles.

The results of the very interesting experiments made by many hygienists for determining (1st) the action of meat extracts on the human organisms and (2nd) the penetrability of high temperatures in muscular fiber, are well known.

It has been demonstrated by Müller, Reunnerich and others, first, that meat extracts have no food value, being almost exclusively composed of substances whose function in nutrition is only that of exciting the nervous system, and consequently, facilitating digestion and assimilation; and secondly, that such extracts may be harmful unless taken in moderate quantities.

It has been proved by Gerlach, Rupprecht, Kuchenmeister, Wolffhügel, Hueppe, Petro, Perroncito, Leuckart, Hertwig, Dinker and others, that the necessary degree of heat for completely destroying the germs of decomposition penetrates with much greater difficulty than is generally supposed, in the interior of pieces of meat cooked in any way. For example:—

(*a*) *Baking—Veal.*—Pieces weighing 14 kilograms heated to a temperature of 103° C. during three and one-half hours. Maximum internal temperature, 89° C.

*Veal.*—Pieces weighing three kilograms subjected to a temperature of 105° C. Maximum internal temperature after three hours, 98° C.

(*b*) *Boiling in an ordinary pot—Beef.*—Pieces weighing three kilograms immersed in boiling water during three hours. Internal temperature less than 100° C.

*Pork.*—A ham weighing four and one-half kilograms, heated to 102° C. in salted water during four hours. Maximum internal temperature, 78° C.

(*c*) *Boiling under pressure, "autoclave" cooker—Pork.*—A ham weighing five kilograms, under the pressure of one atmosphere (120° C.) during three hours and forty-five minutes. Temperature reached in the interior of the ham, 100° C.

(*d*) *Steam cooking under pressure, "autoclave" cooker—Beef.*—Cubic pieces measuring ten centimeters on each side. Pressure during two hours and forty minutes, one atmosphere. (120° C.) Temperature reached, in the middle of the pieces, 102° C.

It thus appears that the use of an autoclave cooker is advantageous when it is desired to obtain a high temperature in the interior of pieces of meat.

The low penetrating power of heat in such pieces, has been and is now the frequent cause of disappointment to manufacturers of preserved foods. The well-known chemist Dumas mentions the following case:—During a certain year all the meat which a French factory attempted to preserve by subjecting it to the usual heating process in hermetically closed tin cans was found to be spoiled after a few months, in spite of the most careful attention to details in the operation. Scientific authorities, after investigating the causes of such an extraordinary fact, decided that the air, during that year, for unknown reasons, must have contained ferments of a hitherto unknown vitality.

The process for preparing meat according to my invention, is as follows:—

1st. The muscular meat is separated from the bones, grease, tendons and from the aponeurotic and gelatinous parts.

2nd. Said meat is then minced.

3rd. The meat is sterilized. For this purpose there is placed in the autoclave cooker, minced muscular meat and filtered water having the temperature of the surrounding atmosphere. For each kilogram of meat, one liter of water is added. Heat rapidly, keeping it in the autoclave one and one-half hours at the pressure of one atmosphere (120° C.).

4th. Take out the meat from the vessel with a perforated ladle similar to a skimmer and place it in large sieves.

5th. Stir it without compression until the temperature is reduced to 25° C.

6th. The meat is again minced.

7th. After straining and removing the grease, the broth obtained is concentrated until it indicates a density of 7° Baumé at a temperature of 15° C.

8th. Mix the meat, cold, with the concentrated broth.

9th. Place the resulting product in the proper receptacles.

10th. Hermetically seal the latter.

11th. Sterilize the contents by heating in the autoclave.

The first sterilization (3rd operation), may be done in another way. The autoclave is divided horizontally in two parts by an iron grating. In the upper part the meat is placed and in the lower one the water. By heating the apparatus the pressure of one atmosphere (120° C.) is kept up in it during one and one-half hours. The steam generated sterilizes the meat. In the lower part of the autoclave the broth is formed.

I prefer, however, the first described method.

If after the second operation and before the third, the meat is allowed to remain during not less than 18 nor more than 24 hours at a temperature of 0° C. (freezing point of water) in closed receptacles, the meat being moistened with an aqueous solution of nitrate of potash, the natural pink color of the muscular fiber will be partially retained.

In preserved meat factories the action of nitrate of potash on raw meat is generally made use of, but it should be limited to the quantities permitted by hygienic principles.

It is also permissible:

(1st) To increase the concentration of the broth (7th operation) thus diminishing the liquid substance of the product; but this concentration should, nevertheless, be effected in such a way that the mixture should have the consistency of a paste.

(2nd) To season the mixture after the 8th and before the 9th operation, or to season the concentrated broth before the 8th.

The product thus obtained is characterized by the high proportion of substances soluble in water, and which possess all the nutritive qualities peculiar to fresh meat.

My process differs from others in use for the preparation of beef which it may be desired to preserve by the Appert, Chevalier-Appert, Martin de Lignac, Fastier and other systems, in that:—

1st.—The fresh meat is very finely minced.

2nd.—It is sterilized by heat before being put in receptacles.

3rd.—It is minced for a second time after cooking.

4th.—It is mixed in this reduced form, with the broth obtained, properly concentrated, in such a manner as to produce a paste which constitutes a food by itself and can also be used for the quick preparation of innumerable dishes.

The use in domestic economy of meat so prepared and preserved, may be considered under two aspects:—

1st.—Such meat may often advantageously take the place of meat extract; for example, adding in the proper proportions, water, salt and rice to a given quantity of this new product and heating the mixture, an excellent soup may be obtained in a few moments, which is very nutritious on account of the particles of muscular tissue which it contains. Vermicelli, or bread crumbs and the like may be used instead of rice.

2nd.—My product is not the ordinary preserved beef, nor is it fluid meat; it will occupy an intermediate place between the two. It is a true aseptic and hygienic meat, an ideal food for convalescents, persons suffering from stomach complaints, recently weaned infants, and persons who habitually are given to insufficient mastication.

The digestiblity of food, both vegetable and animal, depends more on its physical characteristics than on its chemical composition, as foods of all kinds are equally tolerated by the stomach when reduced to the same grade of pulverization.

Proper mastication, as is well known, is necessary not only in order that the mouthful of food may contain saliva in abundance, but also in order that the substances swallowed may come into close contact with the gastric juice.

Therapeutics prescribe for dyspeptics and people with weak stomachs, finely pulverized foods or those which have the consistency of paste, the object being to thus avoid in such cases a laborious chymification and at the same time a difficult pyloric evacuation.

Meat prepared according to my invention, possessing all the gastronomic value of the best preserved beef, will therefore be of inestimable service in dietetic cooking.

The new process hereinbefore explained offers other advantages, i. e.,

1st.—The meat is subjected to two sterilizations, the second of which will consequently be perfect, on account of the fine subdivision of the meat. Furthermore, the concentrated broth with which each particle of the meat is coated, facilitates the penetration of heat.

2nd.—The meat is uniformly cooked.

3rd.—All the different classes into which bovine flesh is divided, are reduced to a single one, of the same commercial value as the highest priced.

The product of my process may be used for the preparation of soups and a great variety of other dishes, as will be readily understood.

Having thus fully described the nature of this invention, what I claim and desire to protect by Letters Patent, is:

1. That process for the preparation of the flesh of animals of the bovine genus, to be used for food, characterized by mincing the flesh; sterilizing it by heating it, while in water, to a sufficiently high temperature and for the required length of time; separating said flesh from the resultant broth; mincing said flesh a second time; and adding to said flesh the said broth, previously strained and concentrated to the proper consistency, so that the whole shall form a thick mixture of paste-like appearance, substantially as described.

2. That method for the preparation of the flesh of animals of the bovine genus for use as food, which is characterized by mincing the flesh; sterilizing it by heating it in the presence of steam to a sufficiently high temperature and for the required length of time; removing the flesh from the broth produced by the action of the steam; mincing the flesh a second time; and adding to said flesh said broth after straining and concentrating it to the proper consistency to form with the flesh a thick mixture of paste-like appearance, substantially as described.

3. That process for the preparation of the flesh of animals of the bovine genus for use as food, which is characterized by mincing said flesh; sterilizing the minced flesh by the application of heat in the presence of moisture; separating the sterilized flesh from the resultant broth; mincing the sterilized flesh; straining and concentrating the broth; mixing the broth with said sterilized flesh so as to form a thick paste-like product; placing said product in a proper receptacle; hermetically sealing said receptacle; and sterilizing the contents of said receptacle by the application of heat.

JULIO BALZARI.

Witnesses:
 A. L. BELLO,
 N. RUCKER.

Copies of this patent may be obtained for five cents each, by addressing the "Commissioner of Patents, Washington, D. C."